United States Patent
Fujimoto et al.

(10) Patent No.: US 10,245,579 B2
(45) Date of Patent: Apr. 2, 2019

(54) EXHAUST GAS PURIFICATION CATALYST AND PRODUCTION METHOD THEREOF

(71) Applicant: NISSAN MOTOR CO., LTD., Yokohama-shi, Kanagawa (JP)

(72) Inventors: Misaki Fujimoto, Kanagawa (JP); Yasunari Hanaki, Kanagawa (JP)

(73) Assignee: NISSAN MOTOR CO., LTD., Yokohama-Shi (JP)

(*) Notice: Subject to any disclaimer, the term of this patent is extended or adjusted under 35 U.S.C. 154(b) by 406 days.

(21) Appl. No.: 15/118,213

(22) PCT Filed: Feb. 18, 2014

(86) PCT No.: PCT/JP2014/053748
§ 371 (c)(1),
(2) Date: Aug. 11, 2016

(87) PCT Pub. No.: WO2015/125206
PCT Pub. Date: Aug. 27, 2015

(65) Prior Publication Data
US 2017/0182481 A1 Jun. 29, 2017

(51) Int. Cl.
*B01J 23/83* (2006.01)
*B01J 23/00* (2006.01)
(Continued)

(52) U.S. Cl.
CPC ............ *B01J 23/83* (2013.01); *B01D 53/94* (2013.01); *B01D 53/944* (2013.01);
(Continued)

(58) Field of Classification Search
CPC ........ B01J 23/83; B01J 23/10; B01J 35/1042; B01J 35/1047; B01J 35/1057; B01J 35/1061; B01J 35/1066; B01J 35/10; B01J 37/08; B01J 37/04; B01J 37/00; B01J 2523/00; B01J 2523/3712; B01J 2523/3725; B01J 2523/48; B01D 53/93;
(Continued)

(56) References Cited

U.S. PATENT DOCUMENTS 9,101,914 B2    8/2015  Ito et al.
2014/0018235 A1*  1/2014  Ito .................. B01D 53/945
                                          502/303

FOREIGN PATENT DOCUMENTS

EP    2 050 497 A1    4/2009
EP    2 692 432 A1    2/2014
WO    WO 2012/133526 A1   10/2012

* cited by examiner

*Primary Examiner* — Melvin C. Mayes
*Assistant Examiner* — Smita S Patel
(74) *Attorney, Agent, or Firm* — Foley & Lardner LLP

(57) ABSTRACT

An exhaust gas purification catalyst contains an oxide 1 and an oxide 2. The catalyst has pores $P_{1-260}$ with a pore size of from 1 nm to 260 nm, that can be measured by the nitrogen absorption method, and the total sum $\Sigma PV_{1-260}$ of the pore volume $PV_{1-260}$ of the pores is equal to or greater than 0.79 cm$^3$/g. The oxide 1 is an oxide with an oxygen release capability. The oxide 2 is represented by $La_xM_{1-x}M'O_{3-\delta}$ (2), where M is at least one element selected from the group consisting of Ba, Sr and Ca, M' is at least one element selected from the group consisting of Fe, Co, Ni and Mn, $\delta$ is the amount of oxygen deficiency, x satisfies $0 \leq x \leq 1$, and $\delta$ satisfies $0 \leq \delta \leq 1$.

8 Claims, 2 Drawing Sheets

(51) Int. Cl.
*B01J 23/10* (2006.01)
*B01J 35/10* (2006.01)
*B01D 53/94* (2006.01)
*B01J 37/04* (2006.01)
*B01J 37/08* (2006.01)
*F01N 3/10* (2006.01)
*F01N 3/28* (2006.01)

(52) U.S. Cl.
CPC .......... *B01D 53/945* (2013.01); *B01J 23/002* (2013.01); *B01J 23/10* (2013.01); *B01J 35/1042* (2013.01); *B01J 35/1047* (2013.01); *B01J 35/1057* (2013.01); *B01J 35/1061* (2013.01); *B01J 35/1066* (2013.01); *B01J 37/04* (2013.01); *B01J 37/08* (2013.01); *F01N 3/103* (2013.01); *F01N 3/2828* (2013.01); *B01D 2255/204* (2013.01); *B01D 2255/2063* (2013.01); *B01D 2255/2068* (2013.01); *B01D 2255/20738* (2013.01); *B01D 2255/407* (2013.01); *B01D 2255/908* (2013.01); *B01D 2255/92* (2013.01); *B01D 2255/9202* (2013.01); *B01J 2523/00* (2013.01); *F01N 2570/12* (2013.01); *Y02T 10/22* (2013.01)

(58) Field of Classification Search
CPC .... B01D 53/945; B01D 53/94; B01D 53/944; B01D 2255/407; B01D 2255/2063; B01D 2255/908; B01D 2255/9202; B01D 2255/204; B01D 2255/2068; B01D 2255/20738; B01D 2255/92; F01N 3/10; F01N 3/28
See application file for complete search history.

EXHAUST GAS PURIFICATION CATALYST AND PRODUCTION METHOD THEREOF

TECHNICAL FIELD

The present invention relates to an exhaust gas purification catalyst and a production method thereof, particularly to an exhaust gas purification catalyst with adequate pore volume and good gas diffusion property and a production method thereof.

BACKGROUND ART

Exhaust gas purification catalysts with an improved redox function have been known in which an oxygen storage material (OSC material) supports LaMM'Ox (M being Ba, Sr, Ca or the like, and M' being Fe, Co, Ni, Mn or the like) (e.g. see Patent Document 1).

CITATION LIST

Patent Document

Patent Document 1: WO 2012/133526A

SUMMARY OF INVENTION

Technical Problem

However, a further study by the present inventors revealed a problem with the prior art that pores of approximately 100 nm of the above-described La oxide, which affects the gas diffusion property, may be closed in the process of impregnating the OSC material with the La oxide or supporting the La oxide with the OSC material, which may cause degradation of the catalyst performance at high space velocity.

The present invention has been made in view of this finding, and an object thereof is to provide an exhaust gas purification catalyst that has good gas diffusion property and can exert its intrinsic catalyst performance, and a production method thereof.

Solution to Problem

As a result of a keen study for achieving the above object, the present inventors found that the above object can be achieved by controlling the pore volume of predetermined pores. The present invention was thus completed.

That is, an exhaust gas purification catalyst of the present invention contains an oxide 1 that is an oxide with an oxygen release capability and an oxide 2 that is represented by the following formula (2):

$$La_xM_{1-x}M'O_{3-\delta} \tag{2}$$

where M is at least one element selected from the group consisting of Ba, Sr and Ca, M' is at least one element selected from the group consisting of Fe, Co, Ni and Mn, $\delta$ is the amount of oxygen deficiency, x satisfies $0 \leq x \leq 1$, and $\delta$ satisfies $0 \leq \delta \leq 1$. Further, the exhaust gas purification catalyst has pores $P_{1-260}$ having a pore size of from 1 nm to 260 nm, that can be measured by a nitrogen absorption method, and a total sum $\Sigma PV_{1-260}$ of the pore volume $PV_{1-260}$ of the pores is equal to or greater than 0.79 cm$^3$/g.

A method of producing an exhaust gas purification catalyst of the present invention is to produce the above-described exhaust gas purification catalyst. The method involves mixing a precursor of the oxide 2 with the oxide 1 before calcining the oxide 1, and then calcining the resultant mixture.

Advantageous Effects of Invention

In the present invention, the pore volume of the predetermined pores is adequately controlled. Therefore, it becomes possible to provide an exhaust gas purification catalyst that has good gas diffusion property and can exert its intrinsic catalyst performance, and a production method thereof.

DESCRIPTION OF EMBODIMENTS

Figure 1:
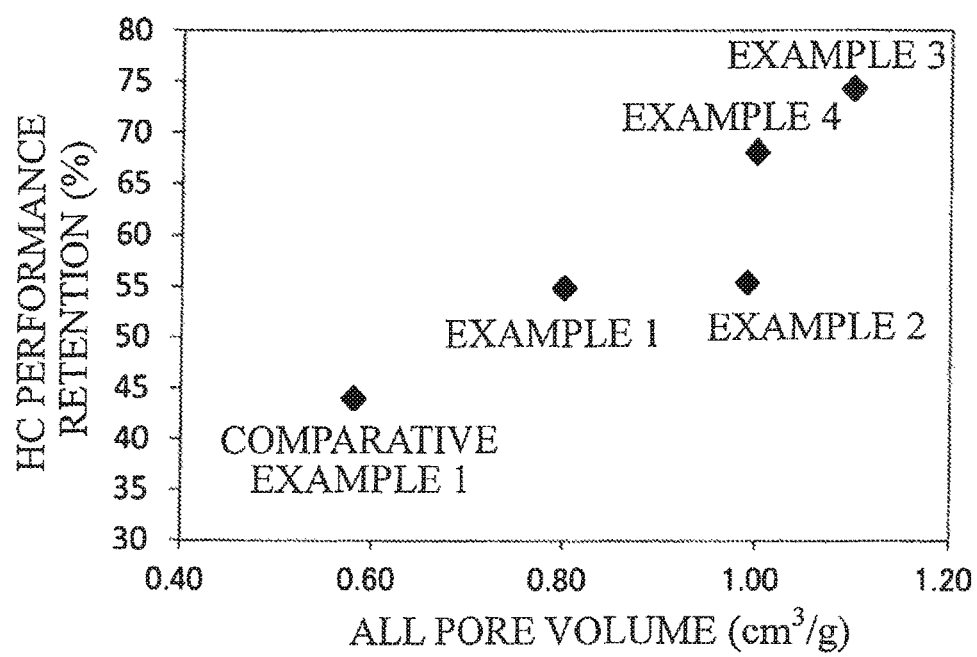
FIG. 1 is a graph illustrating the HC performance retention of exhaust gas purification catalysts of examples and a comparative example.

Hereinafter, an exhaust gas purification catalyst of the present invention will be described.

(1) The exhaust purification catalyst of the present invention contains an oxide 1 and an oxide 2.

The oxide 1 may be any oxygen storage material (OSC material) that has an oxygen storage/release function. Such materials include oxides and complex oxides that contain cerium (Ce) and/or zirconium (Zr).

Examples of the oxide 2 include oxides that contain at least one element selected from the group consisting of lanthanum (La), barium (Ba), strontium (Sr), calcium (Ca), iron (Fe), cobalt (Co), nickel (Ni) and manganese (Mn).

Specifically, examples of such oxides includes oxides of the following formula (2):

$$La_xM_{1-x}M'O_{3-\delta} \tag{2}$$

where M is at least one element selected from the group consisting of Ba, Sr and Ca, M' is at least one element selected from the group consisting of Fe, Co, Ni and Mn, $\delta$ is the amount of oxygen deficiency, x satisfies $0 \leq x \leq 1$, and $\delta$ satisfies $0 \leq \delta \leq 1$, which are employed in the present invention.

(2) The exhaust gas purification catalyst of the present invention has pores ($P_{1-260}$) having a pore size of from 1 nm to 260 nm measured by the nitrogen ($N_2$) absorption method, and the total sum ($\Sigma PV_{1-260}$) of the pore volume ($PV_{1-260}$) of the pores is equal to or greater than 0.79 cm$^3$/g.

Since the pore volume of the pores having a pore size of from 1 nm to 260 nm is equal to or greater than 0.79 cm$^3$/g as described above, the exhaust gas purification catalyst of the present invention can effectively maintain its catalyst performance even at high space velocity (high SV).

(3) The exhaust gas purification catalyst of the present invention is obtained typically by impregnating the powdered oxide 1 with the oxide 2 or supporting the oxide 2 with the oxide 1.

In the exhaust gas purification catalyst of the present invention thus obtained, the increase ratio ($\Delta\Sigma PV_{100-260}$) of the total sum of the pore volume of pores with a pore size of from 100 nm to 260 nm by the supporting process satisfies $\Delta\Sigma PV_{100-260} \geq 1$, where the increase ratio ($\Delta\Sigma PV_{100-260}$) of the total sum of the pore volume is represented by the following equation (1):

$$\Delta\Sigma PV_{100-260} = \text{(Total Sum}(\sigma PV_{100-260}) \text{ of Pore Volume of Exhaust Gas Purification Catalyst after Supporting Process)}/0.11 \quad (1)$$

Typically, the increase ratio ($\Delta\Sigma PV_{100-260}$) of the 100-260 nm pore total volume can be obtained by comparing the pore volume ($\Sigma PV_{100-260}$) within a predetermined pore size range of a catalyst layer made of the oxide 1 with the pore volume ($\alpha PV_{100-260}$) within the predetermined pore size range of a catalyst layer made of the oxide 1 and the oxide 2 supported by the oxide 1. When the increase ratio ($\Delta\Sigma PV_{100-260}$) is equal to or greater than 1, the HC (hydrocarbon) oxidation performance at high SV is improved. That is, the gas diffusion property of the catalyst layer at high SV is improved, and the retention rate of the HC oxidation performance is improved accordingly.

This also means that the oxide 1 can support the oxide 2 without decreasing the pore volume of the pores with a pore size of from 100 to 260 nm of the oxide 1, when oxide 1 supports oxide 2.

The value "0.11" defined in the equation (1) is a standard value of the pore volume within the above-described possible pore size range of the oxide 1.

Next, a production method of the exhaust gas purification catalyst of the present invention will be described.

(4) The production method is to produce the above-described exhaust gas purification catalyst of the present invention, which involves mixing a precursor of the oxide 2 with the oxide 1 before calcining the oxide 1 and then calcining the resultant mixture.

As described above, in the production method of the present invention, the material of the oxide 2 is added before calcining the oxide 1 so that pores are formed. It is not preferred to firstly form (calcine) the oxide 1 and then to make the oxide 1 support the oxide 2, since the oxide 2 may fill the pores of the oxide 1.

Examples of such precursors of the oxide 2 include carboxylates of lanthanum (La) and at least one element selected from the group consisting of barium (Ba), strontium (Sr), calcium (Ca), iron (Fe), cobalt (Co), nickel (Ni) and manganese (Mn). Solution of such carboxylates has a certain level of viscosity, and the oxide 1 is readily impregnated with it.

Carboxylic acids that can be used includes carboxylic acids having one to four carboxyl groups such as gluconic acid, malic acid, maleic acid, acetic acid, succinic acid, fumaric acid, propionic acid, methacrylic acid, acrylic acid, citric acid, tartaric acid, itaconic acid, formic acid and malonic acid.

EXAMPLES

Hereinafter, the present invention will be described in more detail with examples and comparative examples. However, the present invention is not limited to these examples.

Example 1 to Example 3

Carboxylates of oxides 2 listed in Table 1 were prepared and were then mixed with precursors of oxides 1. The mixtures were dried and further calcined at 700° C. The resultant powders were slurried, and the slurries were applied to monolith honeycomb supports, dried and baked at 400° C. Exhaust gas purification catalysts of the examples were thus obtained.

Comparative Example 1 and Comparative Example 2

For Comparative example 1, a precursor of the oxide 1 shown in Table 1 was dried and further calcined at 700° C. The resultant powder was impregnated with a carboxylate of the oxide 2, dried and calcined at 700° C. so that powder was obtained. The resultant powder was slurried, and the catalyst slurry was applied to a monolith honeycomb support, dried and baked at 400° C. An exhaust gas purification catalyst was thus obtained.

For Comparative example 2, a precursor of the oxide 1 shown in Table 1 was dried and further calcined at 700° C. The resultant powder was slurried, and the catalyst slurry was applied to a honeycomb support, dried and baked at 400° C. An exhaust gas purification catalyst was thus obtained.

The blend ratio of the oxides 1 and the oxides 2, the composition of the oxides 1 and the oxides 2, the specification of the honeycomb support, the conditions of the HC purification test are listed in Table 1.

(Performance Evaluation)

(All Pore Volume)

This refers to the total sum of the pore volume of pores with a size of from 1 nm to 260 nm, which is measured by the nitrogen absorption method.

Each powder was subjected to heat, decompression and the like so that absorbed gas was removed. Nitrogen was introduced in a cooled condition. The all pore volume was calculated from the amount of absorption when the nitrogen was absorbed to the material surface to reach the relative pressure.

(Total Sum of 100-260 nm Pore Volume)

This refers to the total sum of the pore volume of pores with a pore size of from 100 nm to 260 nm, which is a part of the all pore volume measured as described above.

(Increase Ratio of Total Sum of 100-260 nm Pore Volume)

The standard value of the 100-260 nm pore volume was determined as 0.11 (which is actually the average in the oxides 1). An increase of $\Sigma PV_{100-260}$ is indicated, when the value obtained by dividing the total sum of the 100-260 nm pore volume ($\Sigma PV_{100-260}$) of the catalyst of the present invention by the standard value is equal to or greater than 1.

(Performance Retention)

This was calculated by the following equation.

Performance Retention (%) = (HC Purification Performance at SV of 30252 $h^{-1}$)/(HC Purification Performance at SV of 20168 $h^{-1}$)×100

TABLE 1

|  | Ratio Oxide 2/ Oxide 1 (wt %) | Oxide 1 Composition | Oxide 2 Composition | Oxide 2 All Pore Volume (cm³/g) | Oxide 2 100-260 nm Pore Volume (cm³/g) | Increase Ratio of 100-260 nm Pore Volume (cm³/g) |
|---|---|---|---|---|---|---|
| Example 1 | 5 | Zn—Ce—Nd—Ox | LaFeO$_3$ | 0.80 | 0.37 | 3.4 |
| Example 2 | 10 | Zn—Ce—Nd—Ox | LaFeO$_3$ | 0.99 | 0.40 | 3.6 |
| Example 3 | 15 | Zn—Ce—Nd—Ox | LaFeO$_3$ | 1.1 | 0.45 | 4.1 |
| Example 4 | 20 | Zn—Ce—Nd—Ox | LaFeO$_3$ | 1.0 | 0.54 | 4.9 |
| Comparative example 1 | 6 | Zn—Ce—Nd—Ox | LaSrFeO$_3$ | 0.58 | 0.058 | 0.5 |
| Comparative example 2 | — | Zn—Ce—Nd—Ox | — | 0.75 | 0.17 | — |

|  | Experimental Conditions | | | | Results |
|---|---|---|---|---|---|
|  | Sample Shape | Evaluation Temperature | Flow Rate | Gas Concentration | Performance Retention (%) |
| Example 1 | 134 g/L | 400° C. | 40 L/min (SV = 20168 h$^{-1}$) 60 L/min (SV = 30252 h$^{-1}$) | C$_3$H$_6$ 1665 ppm CO 0.6% NO 1000 ppm O$_2$ 0.6% H$_2$ 0.2% CO$_2$ 13.9% H$_2$O 10% | 54.9 |
| Example 2 | 0.119 L | | | | 55.4 |
| Example 3 | Honeycomb coating | | | | 74.3 |
| Example 4 | | | | | 68.2 |
| Comparative example 1 | | | | | 44.0 |
| Comparative example 2 | — | — | — | — | — |

Figure 2:
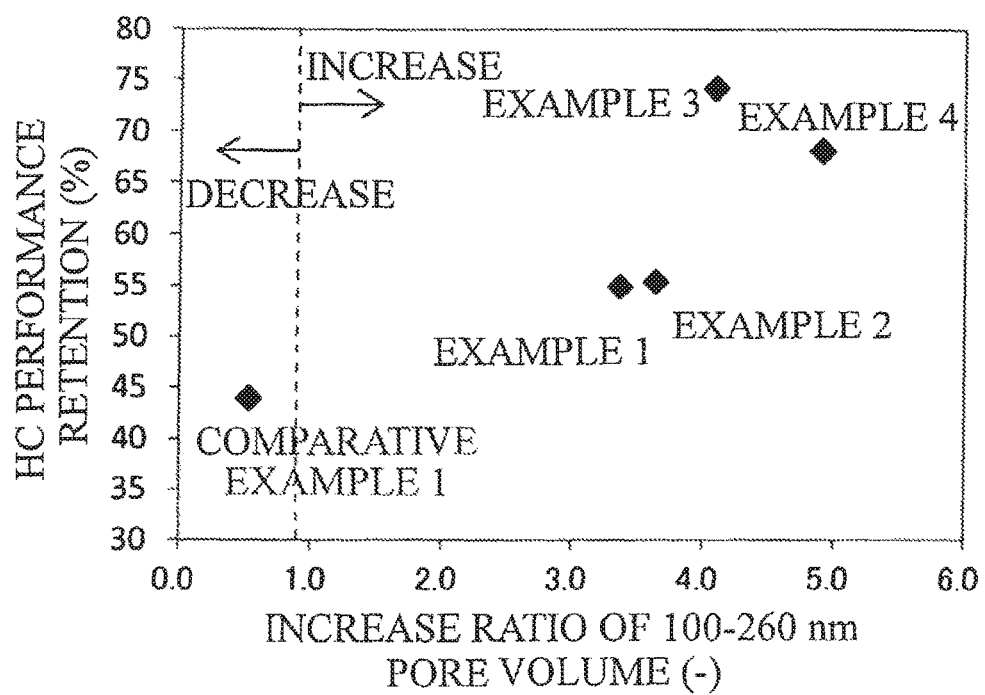
FIG. 2 is a graph illustrating the HC performance retention of exhaust gas purification catalysts of examples and a comparative example.

The HC performance retentions of Table 1 are plotted on graphs of FIG. 1 and FIG. 2 with respect to the all pore volume and the increase ratio of the 100-260 nm pore volume.

While the present invention is described with some embodiments and examples, the present invention is not limited thereto, and a variety of changes can be made within the gist of the present invention.

The invention claimed is:

1. An exhaust gas purification catalyst containing an oxide 1 that is an oxide of an oxygen storage material with an oxygen release/storage function and an oxide 2 that is represented by the following formula (2):

where M is at least one element selected from the group consisting of Ba, Sr and Ca, M' is at least one element selected from the group consisting of Fe, Co, Ni and Mn, δ is the amount of oxygen deficiency, x satisfies 0≤x≤1, and δ satisfies 0≤δ≤1, wherein the exhaust gas purification catalyst has pores P$_{1-260}$ with a pore size of from 1 nm to 260 nm, that can be measured by a nitrogen absorption method, and a total sum ΣPV$_{1-260}$ of a pore volume PV$_{1-260}$ of the pores is equal to or greater than 0.79 cm³/g.

2. The exhaust gas purification catalyst according to claim 1, wherein the exhaust gas purification catalyst is obtained by making the oxide 1 support the oxide 2, and an increase ratio ΔδPV$_{100-260}$ of a total sum of a pore volume of pores with a pore size of from 100 nm to 260 nm by the supporting process satisfies ΔΣPV$_{100-260}$ 1, where the increase ratio ΔΣPV$_{100-260}$ of the total sum the pore volume is represented by the following equation (1), ΔΣPV$_{100-260}$=(Total Sum δPV$_{100-260}$ of Pore Volume of the Exhaust Gas Purification Catalyst after the Supporting Process) /0.11    (1).

3. The exhaust gas purification catalyst according to claim 1, wherein the oxide 1 contains cerium (Ce) and/or zirconium (Zr).

4. The exhaust gas purification catalyst according to claim 2, wherein the oxide 1 contains cerium (Ce) and/or zirconium (Zr).

5. The exhaust gas purification catalyst according to claim 1, wherein the oxide 1 is a complex oxide that contains cerium (Ce) and/or zirconium (Zr).

6. The exhaust gas purification catalyst according to claim 2, wherein the oxide 1 is a complex oxide that contains cerium (Ce) and/or zirconium (Zr).

7. A method of producing the exhaust gas purification catalyst of claim 1, comprising the steps of:

mixing a precursor of the oxide 2 with the oxide 1 before calcining the oxide 1, drying and then calcining a resultant mixture.

8. The method of producing the exhaust gas purification catalyst according to claim 7, wherein the precursor of the oxide 2 is a carboxylate of lanthanum (La) and at least one element selected from the group consisting of barium (Ba), strontium (Sr), calcium (Ca), iron (Fe), cobalt (Co), nickel (Ni) and manganese (Mn).

* * * * *